United States Patent [19]

Schlager et al.

[11] 4,276,272

[45] Jun. 30, 1981

[54] CEMENT WASTE PRODUCT AS SCRUBBING MEDIUM FOR SULFUR OXIDES

[75] Inventors: Richard J. Schlager, Tracy; James F. Murphy, Danville, both of Calif.

[73] Assignee: Kaiser Aluminum & Chemical Corporation, Oakland, Calif.

[21] Appl. No.: 130,665

[22] Filed: Mar. 17, 1980

[51] Int. Cl.³ .................... B01J 8/00; C01B 17/00; C09K 3/00
[52] U.S. Cl. .................... 423/244; 252/189; 252/190
[58] Field of Search .......... 423/242 R, 240 A, 244 A, 423/244 R; 252/184, 189, 190

[56] References Cited

U.S. PATENT DOCUMENTS

| | | | |
|---|---|---|---|
| 3,547,583 | 12/1970 | Wilson | 423/242 A |
| 4,105,744 | 8/1978 | Erdoess et al. | 423/244 A |
| 4,120,645 | 10/1978 | Heian et al. | 423/244 A |

*Primary Examiner*—O. R. Vertiz
*Assistant Examiner*—Gregory A. Heller
*Attorney, Agent, or Firm*—Paul E. Calrow; Andrew E. Barlay

[57] ABSTRACT

Cement waste product (CWP), such as recovered from kilns utilized in cement production, is used for scrubbing of sulfur oxide-containing industrial offgases. The CWP is preconditioned with liquid water prior to employing it as a scrubbing medium. Preconditioning involves addition of sufficient water to the essentially anhydrous CWP to achieve essentially total rehydration of the rehydratable calcium compounds contained in the CWP, for example, aluminates, oxide and sulfates. The preconditioned CWP is dried and used as a highly efficient scrubbing medium for sulfur oxides.

6 Claims, No Drawings

CEMENT WASTE PRODUCT AS SCRUBBING MEDIUM FOR SULFUR OXIDES

BACKGROUND OF THE INVENTION

Environmental considerations require purification of industrial offgases containing atmospheric pollutants such as sulfur oxide emissions. Customarily, sulfur oxides are removed or scrubbed from industrial offgases by using lime, slaked lime or other calcia-containing compounds which are capable of removing the sulfur oxides from the offgas by reacting with the sulfur oxide pollutants. The calcia-containing scrubbing medium, through contact with the sulfur oxides, is converted to a calcium sulfate product, which due to its lack of further sulfur oxide conversion capability, is removed from the scrubbing system.

The fact that calcia-containing compounds are suitable for the removal of sulfur oxide pollutants from industrial offgases generated an interest in other calcium-containing compounds which could replace the presently employed materials. These substitutes have to meet the criteria of being readily available, capable of efficiently removing sulfur oxides from offgases and last but not least to provide an economic advantage over the presently available manufactured scrubbing medium. Cement plant waste product, containing some calcium oxide besides other calcium compounds became a logical replacement candidate for sulfur oxide scrubbing.

Cement plant waste product (CWP) contains calcium silicates, calcium aluminates, calcium carbonate and calcium sulfate, apart from calcium oxide and it results from the calcination of cement precursors. It is generally recovered in essentially anhydrous fine powder form from cement kiln dust recovery systems and not at least due to its fineness, it is usually considered as a waste product rather than a finished cement product. This CWP is available in large quantities, its utilization, for example as sulfur oxide scrubbing medium, would eliminate a serious waste disposal problem and would also provide an economic alternative to lime or slaked lime. Unfortunately, CWP was found to lack satisfactory sulfur oxide scrubbing or conversion ability and thus could not be employed for efficient scrubbing of offgases.

Surprisingly, it has now been discovered the CWP can be utilized as an efficient sulfur oxide scrubbing medium, provided it is, prior to its use in a sulfur oxide scrubbing system, preconditioned with liquid water. This preconditioning involves the essentially total rehydration of the rehydratable components of CWP, followed by drying at a moderate temperature and subsequent employment of the preconditioned CWP for removal of sulfur oxides from industrial offgases. The preconditioned fresh CWP scrubbing medium removes sulfur oxide from offgases at such a degree which exceeds the performance of unconditioned, as is CWP two or threefold or even more.

BRIEF SUMMARY OF THE INVENTION

Cement waste product (CWP), recovered from cement manufacture waste, is employed as a scrubbing medium for the removal of sulfur oxides from industrial offgases. Prior to utilizing the dry, essentially anhydrous CWP as scrubbing medium it is preconditioned by contacting it with liquid water and drying the wetted CWP. The quantity of water employed in the preconditioning step is at least equivalent to the amount required to rehydrate essentially all of the rehydratable constituents of CWP which may contain as rehydratable components, aluminate, oxide and sulfates of calcium. Drying of the preconditioned CWP may be accomplished at a moderate temperature, usually in the range of about 100°–120° C. The preconditioned CWP outperforms unconditioned CWP at least twofold and frequently more.

DETAILED DESCRIPTION OF THE INVENTION

This invention relates to the utilization of cement waste product as scrubbing medium for the removal of sulfur oxides from industrial offgases and also to the method of rendering the cement waste product suitable for sulfur oxide removal by preconditioning the waste product prior to employing it for scrubbing.

For the purposes of this invention the term "sulfur oxides" as used herein refers to sulfur dioxide ($SO_2$) and sulfur trioxide ($SO_3$) and mixtures of these.

The expression "cement waste product" or "CWP" as employed in the instant specification refers to an essentially anhydrous calcium-containing waste product which is generated as a byproduct in cement production facilities, such as rotary or shaft kilns. Generally, the cement waste product or CWP is a fine particulate material, the majority of particles having a size below about 100 mesh (Tyler sieve size) which is equivalent to 0.147 mm. By "majority of particles", particles constituting at least 50% by weight of the total weight are meant. These particles or fines are generally recovered in the dust recovery systems usually associated with cement production facilities and these particles, due to their alkali metal salt content, are unsuitable for incorporation in the produced cement clinker product. CWP can also be generated in the clinker grinding facilities and the fines produced in this step of cement manufacture and also considered to be included in the above definition.

The composition and also the distribution of the components within the CWP composition may vary from cement manufacturer to cement manufacturer; and it may also vary from kiln to kiln within a single cement plant. It has however been found that regardless of the source of CWP, the major constituents of the waste product consist of silicates, lime and calcium carbonate, with minor quantities of sulfur, potassium and sodium compounds, $Al_2O_3$, $MgO$ and $Fe_2O_3$. The silicates and alumina content of the CWP is usually present in the form of calcium silicate and calcium aluminate. Typical CWP composition ranges are shown in Table I below.

TABLE I

| Typical Cement Waste Product Composition | |
|---|---|
| Constituent | Weight % Range |
| CaO | 40–50 |
| $CO_2$ | 16–30 |
| $SiO_2$ | 6–12 |
| $K_2O$ | 5–8 |
| $SO_3$ | 4–8 |
| $Al_2O_3$ | 4–8 |
| MgO | 1–3 |
| $Fe_2O_3$ | 1–3 |
| $Na_2O$ | 0.1–0.5 |
| Loss on Ignition* | 16–30 |

*Measured after ignition at 1000° C. for 1 hour

It can be observed from the Table I that the quantity of individual constituents can vary within reasonably wide limits. Regardless, however of this variation, an efficient sulfur oxide scrubbing medium can be prepared from CWP provided it is preconditioned in accordance with the process of the invention.

Preconditioning of dry CWP is accomplished by the addition of liquid water to dry CWP in an amount at least sufficient to rehydrate the rehydratable constituents. These rehydratable constituents include CaO, calcium silicate, calcium aluminate, $CaSO_3$ and $CaSO_4$, all of which can form hydrated compounds.

In order to determine the quantity of water required for preconditioning the dry CWP, it is possible to analyze the waste product for rehydratable components and then to calculate the minimum water volume to be added. However, since it is generally preferred to add the water required for preconditioning in an amount exceeding the theoretical or calculated volume, the quantity required can be added, without analysis or calculation, by forming a thick or viscous mud or slurry from the CWP and water. Excess water added to the CWP in the preconditioning process does not harm the sulfur oxide scrubbing efficiency; too much water added only affects the energy requirement needed to dry the preconditioned CWP and consequently the economics of using CWP.

Sorption of water on the surface of the CWP was found to be an inadequate means of preconditioning dry CWP. It has been found that preconditioning by contacting CWP with steam or keeping the CWP in a high humidity atmosphere, for example at 100% relative humidity, does not provided an efficient sulfur oxide scrubber. It has been found that the dry CWP and the water needed for preconditioning should be thoroughly admixed to provide an intimate contact between the solid particles and water. For best results, as mentioned before, it is preferred to prepare a thick mud or slurry under agitation to ensure that the intimate solids-liquid contact is achieved. Agitation of the mud or slurry can be acomplished by conventional means. Subsequent to the preconditioning step, the CWP slurry is dried. This drying can be conducted in conventional equipment, for example by using waste heat. The temperature employed for the drying step is usually kept in the range of about 100° C. to about 120° C. Higher temperatures may also be utilized, however care is to be taken not to convert again the preconditioned CWP to an anhydrous product.

The term "drying" for the purposes of this invention means removal of any water added in the preconditioning step in excess of the amount required to essentially rehydrate the rehydratable constituents of the CWP. This can be accomplished either by application of external heat or by allowing evaporation of this excess water at ambient temperature.

The preconditioned CWP can be readily utilized as a sulfur oxide dry scrubbing medium in conventional dry scrubbing installations erected for industrial offgas purification. The preconditioned CWP, when employed as a sulfur oxide scrubbing medium, performs at essentially the same efficiency level as previously employed CaO, $CaCO_3$ and/or slaked lime. Thus, it can be seen that the present invention provides not only an efficient sulfur oxide scrubbing medium, but also a solution to a serious waste disposal problem existing in the cement manufacturing industry.

The following examples will provide further illustration of the concepts of the present invention.

EXAMPLE I

A cement waste product (CWP), obtained from the fines recovery system of a cement plant, was conditioned according to the present invention and thus rendered suitable for sulfur oxide scrubbing. The composition of the CWP is shown in Table II.

TABLE II

| Composition of Cement Waste Product | |
|---|---|
| Constituent | % by Weight |
| CaO | 42.0 |
| $CO_2$ | 26.1 |
| $SiO_2$ | 10.3 |
| $Al_2O_3$ | 6.4 |
| $SO_3$ | 4.6 |
| $K_2O$ | 4.6 |
| MgO | 2.0 |
| $Fe_2O_3$ | 1.5 |
| $Na_2O$ | 0.3 |

The CWP was heated to 1000° C. for about one hour and a weight loss of 26.8% was experienced. This indicated that the material was essentially anhydrous and that the weight loss can essentially be associated with the $CO_2$ content of the CWP.

The material is further characterized by the following physical properties: bulk density: 494.1 grams/liter (30.5 lbs/ft$^3$), angle of repose: 48°. The particle size distribution of the CWP is shown in Table III.

TABLE III

| Particle Size Distribution of CWP | |
|---|---|
| Particle Size* | % by Weight |
| + 200 mesh (0.074 mm) | 0.0 |
| + 325 mesh (0.043 mm) | 1.0 |
| + 400 mesh (0.038 mm) | 3.5 |
| − 400 mesh (0.038 mm) | 96.0 |

*Tyler standard sieve

The CWP was then combined with a sufficient volume of water to form a mud-like viscous mass. The amount of water added was approximately 45 to 50% by weight of the wet mixture and calculations based on the rehydratable constituent quantity in the CWP indicated that this water volume was sufficient to rehydrate all of these constituents, as well as provide an approximately 4-5% excess water content. The mud was vigorously agitated until the entire mass was essentially uniformly wetted and thus conditioned. The conditioned CWP was then dried at about 105° C. for about 1-2 hours, then employed as a scrubbing medium for the removal of sulfur oxides from an offgas generated by the calcination of metallurgical coke.

Scrubbing of the sulfur oxide-containing offgas was accomplished by introducing the preconditioned CWP in a duct where it contacted a gas stream introduced at an average flow rate of about 4423 liters/sec. Contacting was done at a gas temperature of about 815° C. The gas stream contained approximately 272 kg/hour $SO_2$, which corresponded to about 8000–10,000 ppm sulfur oxide calculated as $SO_2$. The contacted CWP particles were then collected in a conventional baghouse and analyzed for $SO_2$ removal capacity. It was found that the removal capacity of the preconditioned CWP was approximately 122 mg $SO_2$/g CWP. In comparison, CWP without the preconditioning described above, under the same scrubbing conditions removed only about 27 mg $SO_2$/g of CWP. Thus it can be observed that the preconditioning treatment of the invention imparted a more than fourfold increase in the CWP sulfur oxide removal capability.

When the performance of the preconditioned CWP is compared with conventional sulfur oxide scrubbing media on a CaO equivalency basis, the CWP performs as a sulfur oxide scrubbing agent at a nearly equivalent rate. In other words, if the CWP contains approximately 50% alkaline CaO, then on a weight basis approximately twice as much CWP is needed than pure CaO. This clearly indicates that the present preconditioning process, when applied to CWP, provides a useful replacement for the conventionally utilized lime or other manufactured calcia-containing scrubbing media at a fractional cost without loss in efficiency.

EXAMPLE II

In this example a CWP material of the composition shown in Table IV was employed for scrubbing sulfur oxide-containing offgas.

TABLE IV

| Composition of Cement Waste Material | |
|---|---|
| Constituent | % by Weight |
| CaO | 47.8 |
| $CO_2$ | 19.9 |
| $SiO_2$ | 8.7 |
| $SO_3$ | 8.0 |
| $K_2O$ | 6.4 |
| $Al_2O_3$ | 5.5 |
| MgO | 2.0 |
| $Fe_2O_3$ | 1.4 |
| $Na_2O$ | 0.3 |

This CWP material had a loss on ignition of 18.3% measured at 1000° C. for one hour; a bulk density of 581.5 g/liter and a particle size distribution shown in Table V.

TABLE V

| Particle Size Distribution of CWP | |
|---|---|
| Particle Size* | % by Weight |
| + 200 mesh (0.074 mm) | 0.0 |
| + 325 mesh (0.043 mm) | 0.4 |
| + 400 mesh (0.038 mm) | 1.2 |
| − 400 mesh (0.038 mm) | 97.2 |

*Tyler standard sieve

This CWP was then preconditioned by admixing it with water. The volume of water added to the CWP was sufficient to produce a mud-like admixture containing approximately 45–50% by weight water. This water volume was sufficient to rehydrate the rehydratable constituents of the CWP and also to provide an approximately 5% excess beyond the water quantity required for hydration. The mixture was thoroughly mixed, then dried at 105° C. for about two hours. The dried, conditioned CWP was then used as sulfur oxide scrubbing medium under the same circumstances and conditions described in the previous Example.

When the sulfur oxide-laden CWP was removed from the system, analysis indicated that its sulfur oxide removal capacity, calculated as $SO_2$, was 127 mg $SO_2$/g CWP. This $SO_2$ removal capability was close to five times of the efficiency obtained with unconditioned CWP, employed in the condition it was obtained from the cement plant.

The above examples convincingly show the efficient and economic nature of the present invention without however intending to limit the scope of the invention thereto.

We claim:

1. A process for rendering essentially anhydrous cement waste product suitable for use as a scrubbing medium for sulfur oxides such as present in industrial offgases which comprises treating the cement waste product, characterized by a particle size wherein a majority of the particles have a size below about 0.147 mm and containing a rehydratable calcium compound selected from the group consisting of calcium oxide, calcium silicate, calcium aluminate, calcium sulfite, calcium sulfate and mixtures thereof, with sufficient liquid water to at least rehydrate essentially all of the rehydratable calcium compound content of the cement waste product and drying the treated product at a temperature which is below the temperature at which any of the rehydrated components would be reconverted to the anhydrous form.

2. Process according to claim 1, wherein the liquid water added to the treating step is in excess of the amount required for rehydration of essentially all of the rehydratable components of the waste product.

3. Process according to claim 1, wherein the drying of the treated cement waste product is accomplished within the temperature range of about 100° C. and about 120° C.

4. A process for removing sulfur oxides from industrial offgases which comprises scrubbing the offgases with a cement waste product which product is recovered as a byproduct from cement manufacturing plants and which is characterized by a particle size wherein a majority of the particles have a size below about 0.147 mm; the waste product being further characterized by being essentially anhydrous and containing rehydratable calcium compounds selected from the group of calcium oxide, calcium silicate, calcium aluminate, calcium sulfite, calcium sulfate and mixtures thereof; the cement waste product being preconditioned for scrubbing prior to its use as a scrubbing medium for sulfur oxides by intimately admixing the essentially anhydrous cement waste product with sufficient liquid water to at least rehydrate essentially all of the rehydratable components of the waste product, drying the preconditioned waste product at a temperature below at which any of the rehydrated components would be reconverted to the anhydrous form and utilizing the preconditioned and dried cement waste product as a scrubbing medium for the removal of sulfur oxides from industrial offgases.

5. Process according to claim 4, wherein the preconditioning step the water admixed with the cement waste product is in excess of the amount required for rehydrating the rehydratable components of the waste product.

6. Process according to claim 4, wherein the drying of the preconditioned cement waste product is accomplished in the temperature range of about 100° C. and 120° C.

* * * * *